United States Patent
Gerke

(10) Patent No.: US 9,300,755 B2
(45) Date of Patent: Mar. 29, 2016

(54) SYSTEM AND METHOD FOR DETERMINING INFORMATION RELIABILITY

(76) Inventor: Matthew Gerke, Washington, DC (US)

( * ) Notice: Subject to any disclaimer, the term of this patent is extended or adjusted under 35 U.S.C. 154(b) by 1299 days.

(21) Appl. No.: 12/579,059

(22) Filed: Oct. 14, 2009

(65) Prior Publication Data

US 2010/0268776 A1    Oct. 21, 2010

Related U.S. Application Data

(60) Provisional application No. 61/170,889, filed on Apr. 20, 2009.

(51) Int. Cl.
| | |
|---|---|
| *G06F 15/16* | (2006.01) |
| *H04L 29/08* | (2006.01) |
| *G06Q 10/10* | (2012.01) |
| *H04L 29/06* | (2006.01) |

(52) U.S. Cl.
CPC .............. *H04L 67/306* (2013.01); *G06Q 10/10* (2013.01); *H04L 63/0263* (2013.01); *H04L 63/102* (2013.01)

(58) Field of Classification Search
CPC .... G06Q 10/10; H04L 67/306; H04L 63/102; H04L 63/0263
USPC ........................................................ 709/204
See application file for complete search history.

(56) References Cited

U.S. PATENT DOCUMENTS

| | | | |
|---|---|---|---|
| 7,801,738 B2 * | 9/2010 | Agarwal et al. ................ 705/1.1 |
| 7,822,631 B1 * | 10/2010 | Vander Mey et al. ........ 705/7.29 |
| 8,150,875 B1 * | 4/2012 | Dubrovsky et al. ........... 707/783 |
| 2005/0251399 A1 * | 11/2005 | Agarwal et al. .................... 705/1 |
| 2006/0004748 A1 * | 1/2006 | Ramarathnam et al. .......... 707/6 |
| 2008/0163380 A1 * | 7/2008 | Liu ................................. 726/28 |
| 2009/0217196 A1 * | 8/2009 | Neff et al. ...................... 715/799 |
| 2010/0287151 A1 * | 11/2010 | Mustonen ..................... 707/707 |
| 2011/0029613 A1 * | 2/2011 | Hedditch ...................... 709/205 |
| 2011/0113320 A1 * | 5/2011 | Neff et al. ..................... 715/230 |

* cited by examiner

*Primary Examiner* — Ranodhi Serrao
(74) *Attorney, Agent, or Firm* — Locke Lord LLP; Scott D. Wofsy; Christopher J. Capelli

(57) ABSTRACT

In a system and method for determining the trustworthiness of network content (e.g., information units), the system collects information on the logical relationship between various information units (e.g. various information units may be logically inconsistent, logically identical, or otherwise logically related). The system also collects from a plurality of users, trustworthiness ratings for various information units. Based on these logical relationships and collaborative filtering with the users' preferences, the system generates individualized trust ratings that predict how much a user will trust any given information unit.

13 Claims, 9 Drawing Sheets

SYSTEM AND METHOD FOR DETERMINING INFORMATION RELIABILITY

PRIORITY CLAIM

This application is a non-provisional application of, claims priority to and the benefit of U.S. Provisional Patent Application Ser. No. 61/170,889 filed on Apr. 20, 2009, the entire contents of this application is incorporated herein by reference.

BACKGROUND

The Internet contains a very large quantity of information. Much of this information may be untrustworthy. That is, a consumer of this information cannot easily discern what information found via the Internet is trustworthy. It can take the average consumer a tremendous amount of time to sort through Internet sites to determine whether the information that the user is viewing is contradicted by other information elsewhere on the internet, or, if it is contradicted, which of the viewpoints to believe. The consumer may therefore never determine whether the information that he is viewing is trustworthy. For example, a disreputable source (i.e., a supermarket type tabloid or a humor paper) may be publishing questionable information that appears trustworthy. In another example, a blogger may publish false information on a particular subject that may appear factual. In another example, the source may be reputable (i.e., a mainstream type newspaper), but inadvertently publish incorrect information based on a disreputable or unverified source. In another example, there may be a genuine disagreement over the facts, with different sources taking different positions in the dispute. As a result, consumers tend to become skeptical of information they read online.

Consumers also differ enormously on what sources they consider reputable, reliable, unbiased, or trustworthy. For example, some consumers believe that one news outlet (e.g., a conservative leaning news outlet) publishes trustworthy information while a second new outlet (e.g., a liberal leaning news outlet) publishes untrustworthy information. Other consumers may hold an opposing view of the same news outlets. Therefore, a one-size-fits-all solution that attempts to categorize information as true or false for all users will inevitably appeal to only a limited audience.

SUMMARY

To address the large volume of information available online, a system and method for determining the trustworthiness or reliability of network content is provided. The system provides a prediction whether a given user will believe any given piece of network content, thus saving the consumer the time required to do exhaustive research. If the user does choose to research whether an issue is true, the system also provides the ability to quickly analyze different viewpoints on an issue. To do this, the system collects information on the logical relationship between various pieces of network content (e.g. various pieces of content may be logically inconsistent, logically identical, or otherwise logically related). The system also collects from a plurality of users, trustworthiness ratings for various pieces of network content. Based on these logical relationships and user preferences, the system generates individualized trust ratings that predict how much any given user will trust any given piece of network content. If a user makes a request for network content (e.g., the user requests a webpage), the system can generate a trust rating for the requested network content (or any individual item of content on the webpage). For example, the system can generate an individualized trust rating for User A and Statement X by determining whether other users who are similar to User A trusted content that is similar to Statement X. In one embodiment, these similarities are determined using a combination of logical analysis and collaborative filtering. However, it should be appreciated that the individualized trust rating can be generated in any suitable manner.

In one embodiment of a system for determining information trustworthiness, the system includes at least one terminal and at least one ratings server. The at least one terminal and the at least one rating server are in communication via at least one network to: (a) receive a trust rating request for an information unit from a user, (b) generate the trust rating for the information unit based on collaborative filtering with user profile data and at least one stored logical relationship between the requested information unit and at least one other information unit, and (c) display the generated trust rating to the user.

In another embodiment, a method for determining information trustworthiness includes: (a) receiving a trust rating request for an information unit from a user at a ratings server, (b) generating the trust rating for the information unit based on collaborative filtering with user profile data and at least one stored logical relationship between the requested information unit and at least one other information unit at the ratings server, and (c) display the generated trust rating to the user on a terminal.

Additional features and advantages are described herein, and will be apparent from the following Detailed Description and the figures.

DETAILED DESCRIPTION

A system and method for determining the trustworthiness or reliability of network content is provided. The system predicts whether a given user will believe any piece of network content, thus saving the consumer the time required to do exhaustive research, and allowing him to instantly know whether the information that he is viewing is trustworthy. Because not every user has the same beliefs about what information or which sources to trust, the system is capable of generating an individualized trust rating or prediction for any combination of user and content. The trust rating is a prediction of whether, if the given user were to perform exhaustive research on selected network content, the user would believe the given network content. For example, if User A is reading a webpage that contains the sentence "Global warming is caused by man," the system will use available information about User A to predict whether, after exhaustive research into the issue, User A would believe that sentence to be factually correct.

To achieve this, the system collects information on the logical relationship between various pieces of network content (e.g. various pieces of content may be logically inconsistent, logically identical, or otherwise logically related). The system also collects, from a plurality of users, trustworthiness ratings for various pieces of network content (including sentences or even entire websites). Based on these logical relationships and user preferences, the system generates individualized trust ratings that predict how much any given user will trust any given piece of network content. For example, the system can generate an individualized trust rating for User A and Statement X by determining whether other users who are similar to User A trusted content that is similar to Statement X. However, the system would generate a trust rating for User B and Statement X that might differ from the trust rating for User A and Statement X, if User B has substantially different preferences. In one embodiment, these similarities are determined using a combination of logical analysis and collaborative filtering. However, it should be appreciated that the trust rating can be generated in any suitable manner.

Figure 1:
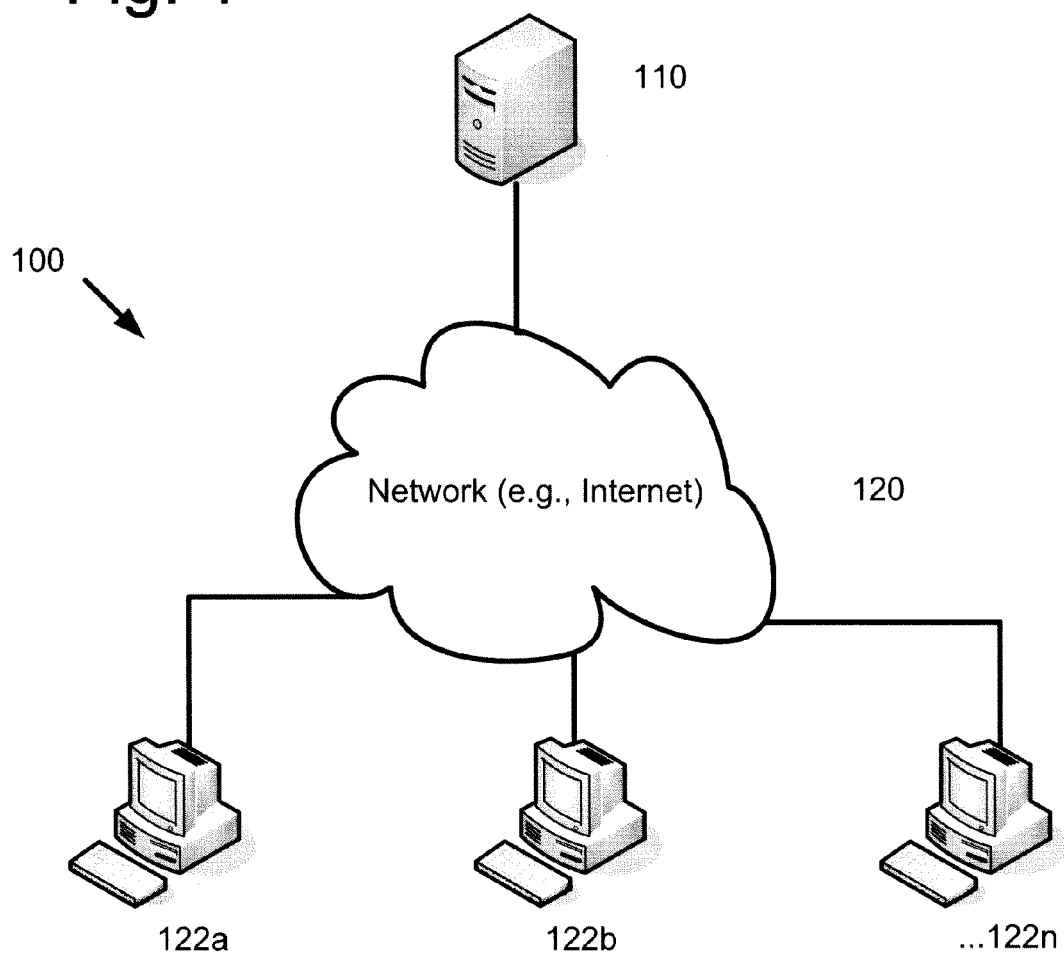
FIG. 1 is a diagram of one network based system for determining information trustworthiness according to one embodiment.

FIG. 1 illustrates an embodiment of a network-based system for collecting and determining trustworthiness of network content. The system of FIG. 1 includes at least one information reliability server 110, at least one network 120, and at least one client device 122. In one embodiment, network 120 may be implemented as the Internet.

Information reliability server 110 may communicate with client device 122. Information reliability server 110 may be implemented as one or more servers which provide a service over network 120. In one embodiment, information reliability server 110 receives requests for ratings of network content. The information reliability server 110 may process the requests and return a rating associated with each request back to each client terminal that made a request. Information reliability server 110 may also forward the request to other information reliability servers for processing (e.g., for load balancing, specialized requests, or any other suitable reason). In one embodiment, information reliability server 110 may be a stand alone server (e.g., does not handle web page requests or other web/network service requests) that only processes network content rating requests and provides ratings to client devices 122. In an alternative embodiment, information reliability server 110 may be a web front end server. For example, information reliability server 110 can be implemented as one or more servers used to provide web pages and provide ratings for network content. A user may request webpages through information reliability server 110 from client device 122 over network 120. Information reliability server 110 may simultaneously or at any other suitable time receive and provide ratings of network content to/from client device 122. It should also be appreciated that functionality of the information reliability server 110 can be modular and can therefore be paired with any other network services.

Client devices 122 communicate with information reliability server 110 over network 120 and may include at least one browser based application. The browser application may be a network browser application (e.g., Microsoft® Internet Explorer®, Firefox®, or any other suitable application) used to access content provided by information reliability server 110 and other web servers. Additionally, the browser may include an application that allows a user easily request a rating of network content or provide a rating a network content. In one embodiment, the browser application may include a toolbar (e.g., as a plugin program for a browser application) to implement the functionality of obtaining ratings and providing ratings for network content. In an alternative embodiment, the program that provides the functionality of obtaining ratings and providing ratings for network content may be a standalone program (e.g., not running though a web browser) on client device 122 that can communicate with information reliability server 110 through network 120. In another alternative embodiment, where the program that provides the functionality of obtaining ratings and providing ratings for network content is a standalone program, the program interoperates with the network browser. It should be appreciated that while the toolbar application is described throughout the present application as the user application interface to the information reliability system, the functionality described herein can be implemented using any suitable method or technology such as, but not limited to, a webpage based application (e.g., a JAVA applet, or an AJAX application) or a standalone application that interfaces with the user's web browser or other information retrieval program.

Figure 2:
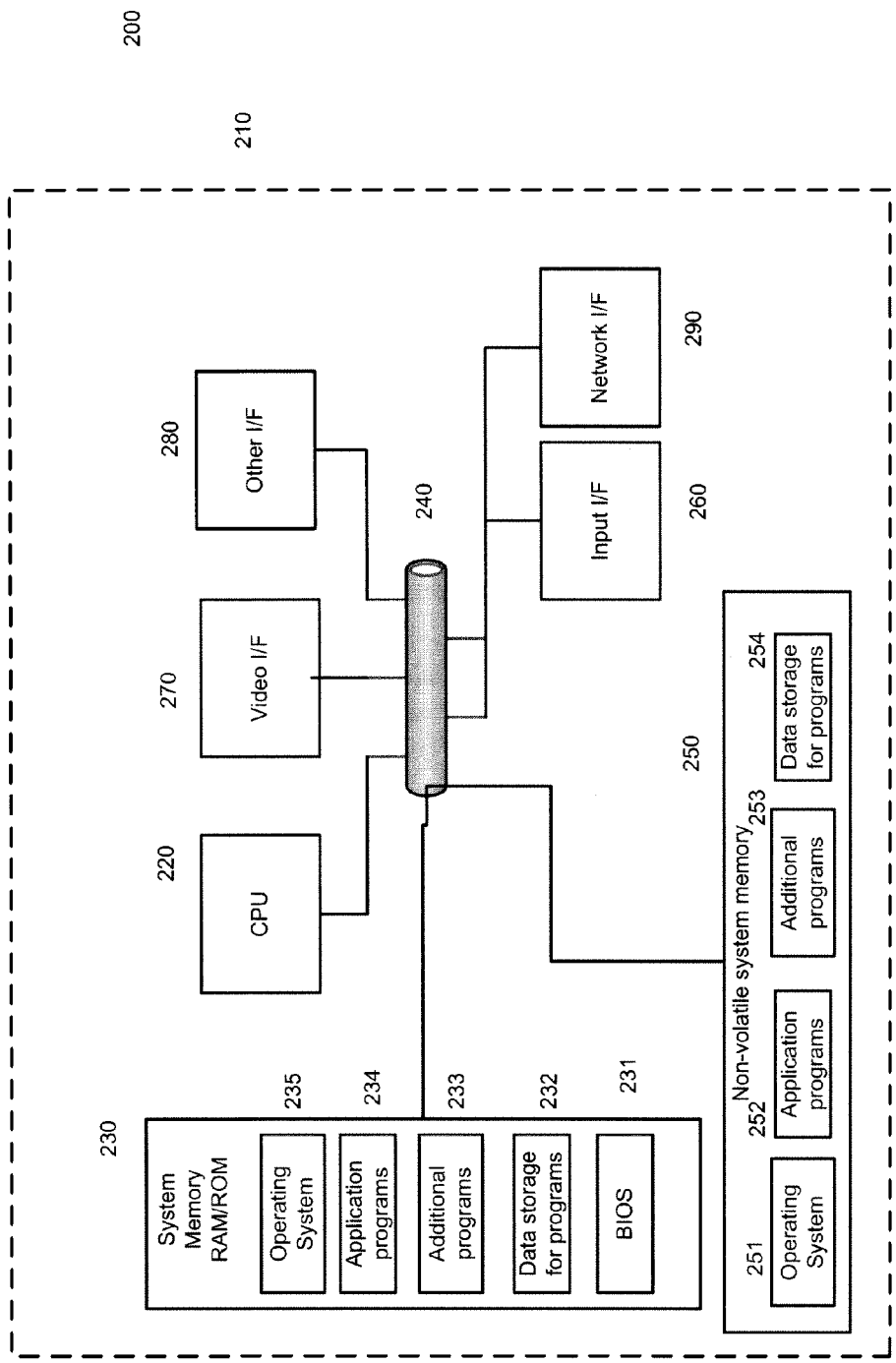
FIG. 2 is a diagram of one suitable computing system environment on which the information trustworthiness rating system may be implemented according to one embodiment.

FIG. 2 illustrates one embodiment of a computing system environment 200 on which the information reliability system may be implemented. It should be appreciated that the computing system environment 200 is only one example of a computing environment and is not intended to suggest any limitation as to the scope of use or functionality of the technology. Computing environment 200 should not be interpreted as having any dependency or requirement relating to any one or combination of the illustrated or non-illustrated components. In one embodiment, the computing environment of FIG. 2 may be used to implement information reliability server 110 and/or client device 122.

The information reliability system is also operational with numerous other general purpose or special purpose computing system environments or configurations. Examples of well known computing systems, environments, and/or configurations that may be suitable for use with the information reliability system include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, or any other suitable systems or device.

The information trustworthiness rating system may be described in the general context of computer-executable instructions, such as program modules, being executed by a computer. Generally, program modules include routines, programs, objects, components, and data structures that perform particular tasks or implement particular abstract data types. The information trustworthiness rating system may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the present technology includes a general purpose computing device in the form of a computer 210. Components of computer 210 may include, but are not limited to, a processing unit 220, a system memory 230, and a system bus 240 that couples various system components including the system memory to the processing unit 220. The system bus 240 may be any of several types of bus structures including a memory bus or memory controller, a peripheral bus, and a local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 210 typically includes a variety of computer readable media. Computer readable media can be any available media that can be accessed by computer 210 and includes both volatile and nonvolatile media, removable and non-removable media. For example, computer readable media may include computer storage media and communication media. Computer storage media may be volatile, nonvolatile, removable, and/or non-removable memory media implemented in any manner for storage of information such as computer readable instructions, data structures, program modules or other data. Computer storage media may also include RAM, ROM, EEPROM, flash memory or other memory present technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media may include computer readable instructions, data structures, program modules or other data in a transport mechanism and include any information delivery media. By way of example, and not limitation, communication media includes wired media such as a wired network or direct-wired connection, and wireless media such as acoustic, RF, infrared and other wireless media. Combinations of the any of the above may also be included within the scope of computer readable media.

The system memory 230 includes computer storage media in the form of volatile and/or nonvolatile memory such as read only memory (ROM) and random access memory (RAM). A basic input/output system 231 (BIOS), contains the basic routines that help to transfer information between elements within computer 210, such as during start-up, is typically stored in ROM. RAM may contain data and/or program modules that are immediately accessible to and/or presently being operated on by processing unit 220. For example, FIG. 2 illustrates data storage for programs 232, additional program 233, application programs 234, and operating system 235.

The computer 210 may also include other removable/non-removable, volatile/nonvolatile computer storage media. For example, FIG. 2 illustrates non-volatile memory 250 (e.g., a hard disk drive) that reads from or writes to non-removable, nonvolatile magnetic media, such as a magnetic disk drive or any other suitable optical media. Other removable/non-removable, volatile/nonvolatile computer storage media that can be used in the operating environment include, but are not limited to, CDs, magnetic tape cassettes, flash memory cards, digital versatile disks, digital video tape, solid state RAM, solid state ROM, and the like. The computer storage media is typically connected to the system bus 240.

The drives and their associated computer storage media discussed above and illustrated in FIG. 2, provide storage of computer readable instructions, data structures, program modules and other data for the computer 210. For example, non-volatile memory 250 is illustrated as storing operating system 251, application programs 252, additional programs 253, and data storage for programs 254. Note that these components can either be the same as or different from data storage for programs 232, additional program 233, application programs 234, and operating system 235. operating system 251, application programs 252, additional programs 253, and data storage for programs 254 are given different numbers here to illustrate that, at a minimum, they are different copies. A user may enter commands and information into the computer 210 through input devices such as a keyboard and a pointing device (e.g., a mouse, trackball or touch pad). Other input devices may include a microphone, joystick, game pad, satellite dish, scanner, or the like. These and other input devices are often connected to the processing unit 220 through an input interface 260 that is coupled to the system bus, but may be connected by other interface and bus structures, such as a parallel port, game port, IEEE 1394, or a universal serial bus (USB). A monitor or other type of display device is also connected to the system bus 240 via an interface, such as a video interface 270. In addition to the monitor, computers may also include other peripheral output devices such as speakers or printers, which may be connected through other peripheral interfaces 280.

The computer 210 may operate in a networked environment using logical connections to one or more remote computers through network 120. The remote computers may be a personal computer, a server, a router, a network PC, a peer device or other common network node, and may includes many or all of the elements described above relative to the computer 210. The logical connections may include a local area network (LAN) and a wide area network (WAN), but may also include other networks. Such networking environments are commonplace in offices, enterprise-wide computer networks, intranets and the Internet.

When used in a LAN networking environment, the computer 210 is connected to a LAN through a network interface or adapter 290. When used in a WAN networking environment, the computer 210 typically includes a modem or other means for establishing communications over the WAN, such as the Internet. The modem, may be connected to the system bus 240 via the user input interface 280, or any other suitable interface. In a networked environment, program modules depicted relative to the computer 210, or portions thereof, may also be stored in a remote memory storage device. It should be appreciated that the network connections described are exemplary and other means of establishing a communications link between the computers may be used.

Figure 3:
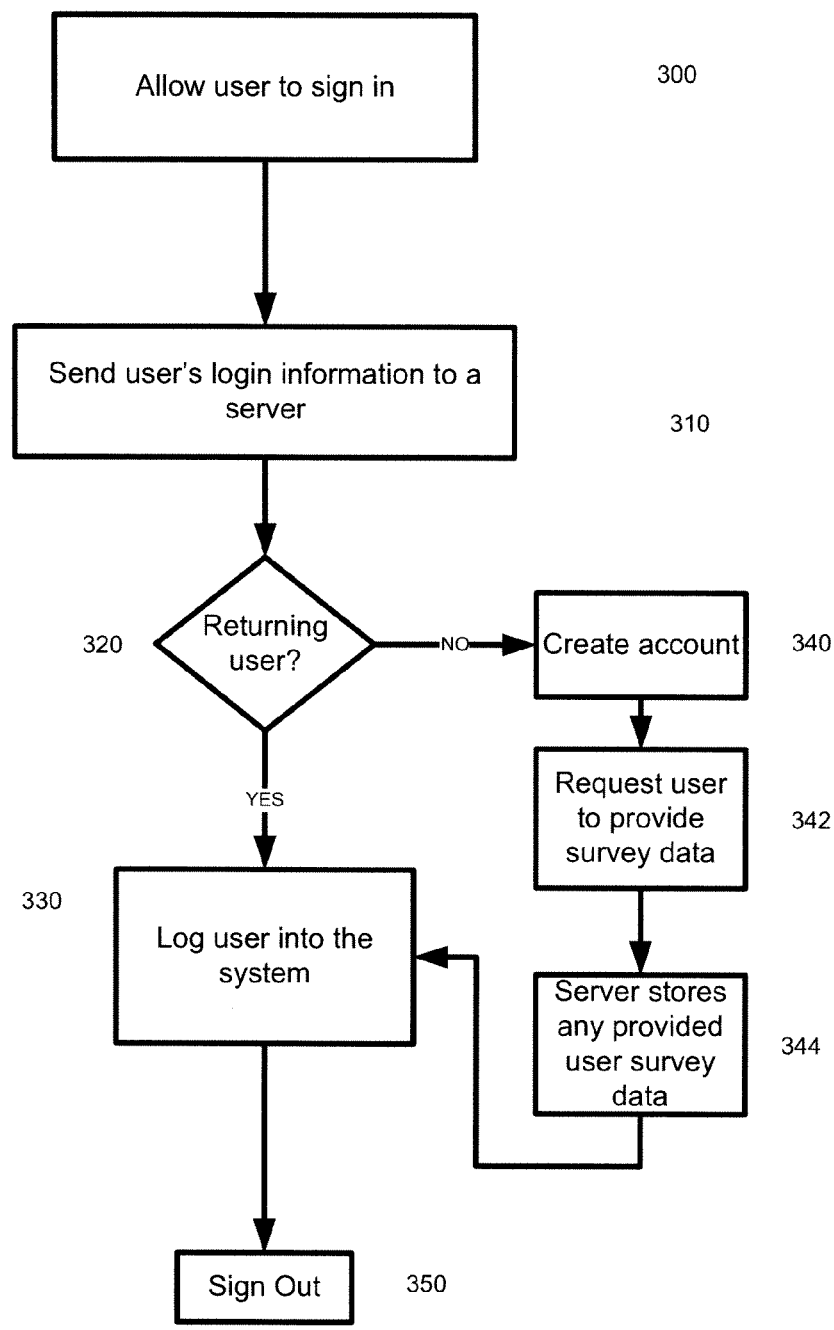
FIG. 3 is a flowchart illustrating a process for allowing a user to access the system for determining the trustworthiness of network content according to one embodiment.

FIG. 3 is a flowchart of one embodiment of a process for logging into the information reliability system for providing ratings of network content. In one embodiment, a client device 122 includes a network-based browser with a toolbar plugin application that captures a user's login information. For example, the toolbar application allows a user to enter a user ID and a password to access the user's account at step 300. However, any suitable user authentication method can be used. The toolbar application sends the captured user information to information reliability server 110 to determine if the user has an existing account stored in information reliability server 110 at step 320. If the information reliability server 110 determines that the user has an existing account and the login information is correct, the information reliability server 110 allows the user to access the user's account and system features at step 330. If the information reliability server 110 determines that the user has an existing account but the login information is incorrect, the information reliability server 110 allows the user to attempt to provide the correct login information at least twice (or any suitable number of times). In various embodiments, if the user is unable to login (authenticate), the system can allow the user to participate in an account/password recovery process, direct the user to create an account as in step 340, allow the user to access the system as a guest, or disable the network content rating system.

If the information reliability server 110 determines that the user does not have an existing account, the information reliability server 110 allows the user to create an account at step 340. In one embodiment, the toolbar application provides an interface to collect all of the necessary user information to create a user account. In one embodiment, the system may require that the user choose a unique username and provide some preferences data about the user (e.g., websites that the user trusts) as illustrated in step 342 as requesting survey data. However, any suitable quantity and type of information may be collected from the user. In an alternative embodiment, the toolbar application directs the network-based browser to retrieve and load a user account creation interface (e.g., a webpage) rather than collect the user information through the toolbar application. After the user has provided the requested survey data, client device 122 sends the data to information reliability server 110 and the server stores or updates the values associated with the user at step 344. After the user has created an account, the information reliability server 110 automatically allows the user to access the user's account. Alternatively, the system may require the user return to step 300 and log into the user's newly created account before allowing the user to access the user's account and system features. In one embodiment, the predetermined event includes a user visiting a website or the user providing a rating for a website, which are described in greater detail below. It should be appreciated that any suitable event can be a predetermined event used trigger further system operation. In one embodiment, the system allows the user to log out as illustrated in step 350 at any suitable time.

It should also be appreciated that in alternative embodiments, the client-side software (e.g., the toolbar application) that communicates with information reliability server 110 to provide or receive trust ratings for network content may be a standalone program.

Figure 4:
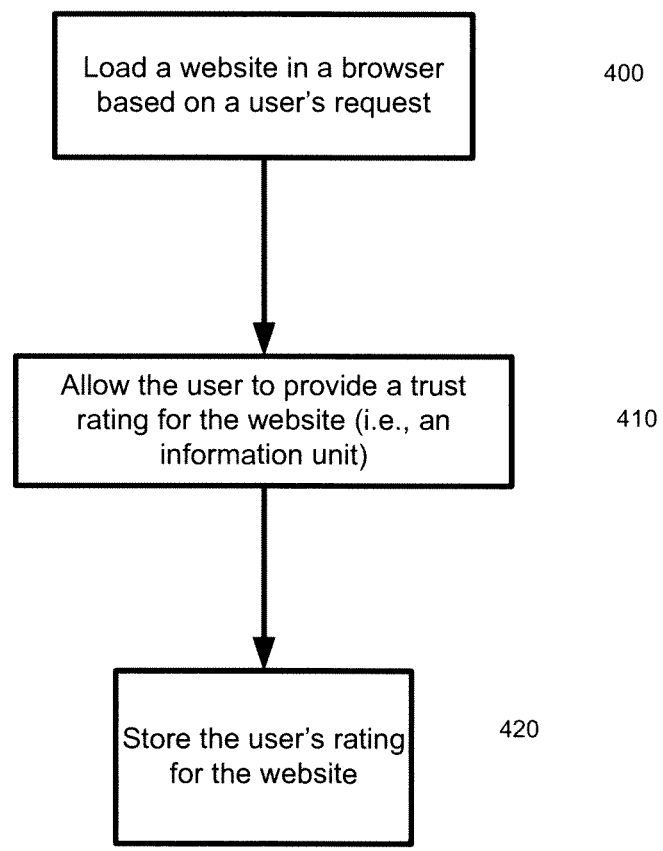
FIG. 4 is a flowchart illustrating a process for allowing a user to rate network content according to one embodiment.

FIG. 4 is a flowchart of one embodiment of an information reliability system that includes a process for allowing a user to provide trust ratings for network content. For example, the system can collect a user's trust rating for a website or any other suitable network content (hereinafter an "information unit"). The information unit can include, but is not limited to, an article, a paragraph, a sentence, a phrase, an image, a number, or a link. The system collects and stores the user's trust rating for the information unit. As described below, any trust rating that the user provided for an information unit may be used to generate individualized trust ratings for the providing user or other users for this or other information units.

In one embodiment, the flowchart of FIG. 4 begins when a user causes a browser to load a website at step 400. At step 410, the system at any time allows the user to provide a trust rating for the loaded website or an information unit within the website. If the user provides a trust rating for the loaded website, the system stores the user's rating for the website as illustrated at step 420. The system can then use the user's trust rating for the loaded website as one factor to generate the user's individualized trust ratings for other websites, and to generate individualized ratings for other users when visiting this or other websites.

In one such embodiment, the system allows a user to provide ratings for information units in a network-based browser application. A toolbar plugin application on client device 122 allows a user to provide a trust rating for a website that the user is viewing (e.g., the active web browser window or the active tab within the web browser window). For example, the toolbar application includes a predetermined number of unselected stars (e.g., 5 stars) which correspond to the level of trust a user has in the website the user is viewing. If the user completely trusts the website, the user can select the maximum number of stars for the website (e.g., 5 stars). On the other hand, if the user does not completely trust the website, the user can provide a lower number of stars which correspond to the user's level of trust in the website (e.g., 3 stars). It should be appreciated that any quantity of stars can be used to collect a user's trust rating for information units. It should also be appreciated that a user's rating for the website can be expressed in any suitable manner (e.g., using a numeric scale, or a unique set of symbols with each symbol signifying the user's degree of trust in the information unit).

In one embodiment, the toolbar application displays the user's provided trust rating for the website. The toolbar may display the trust ratings in stars for convenient visualization. However, the trust ratings can be displayed in the toolbar application in any suitable manner (e.g., as numerical values, a green dot for a trustworthy website, a yellow dot for a questionable website, a red dot for an untrustworthy website, etc. . . . ). In one embodiment, the toolbar application may collect the user's trust rating in one manner, and display the user's trust rating in a different manner. For example, the user may provide a trust rating for a website using a drop down menu with the numeric values of 1-5. When the toolbar displays the user's trust rating for the website, the toolbar may display the trust rating as stars, colored dots, or any other suitable manner.

In one embodiment, the system stores the user's rating for the information unit so that it is accessible at a later time. The toolbar application can store the user's rating for the website in a temporary/permanent cache or in a database on client device 122. Thus, if the user ever returns to the website, the toolbar application can search the cache or database and quickly display the user's rating for the website without requiring the toolbar to contact the information reliability server 110 for a trust rating.

In one embodiment, information reliability server 110 stores the user's website trust rating. In this embodiment, the toolbar application sends the URL the user has rated along with the user's website trust rating to information reliability server 110. The toolbar application may capture the date the user provided the trust rating, the user's identification information, any other suitable information. The information reliability server 110 stores any received data (e.g., the data associated with the website trust rating) received from the toolbar application in a database. In one embodiment, the information reliability server 110 and the toolbar application provides the user with a confirmation that the user's rating of the website was stored with information reliability server 110; however it should be appreciated that confirmation is not required. For example, if information reliability server 110 transmits a confirmation to the toolbar application, the toolbar application displays a confirmation notice to the user (e.g., "RATING SAVED", a checkmark, or any other suitable confirmation). In one embodiment, the toolbar application may also update the toolbar application's cache to reflect that the user's website trust rating was stored in information reliability server 110.

In one embodiment, the system can provide reminders to the user to provide a trust rating of a website that the user is viewing or has previously viewed if the user did not provide a trust rating for the website. For example, the toolbar application can periodically query the user to provide a trust rating for a website that the user is viewing with a message displayed in the toolbar application or a pop-up window (or in any other suitable manner). The toolbar application can also periodically query the user to provide a trust rating to a website that the user previously viewed, but did not rate at the time the user viewed the website.

It should be appreciated that in alternative embodiments, the user may be able to rate information units smaller than an entire website as discussed above.

Figure 5:
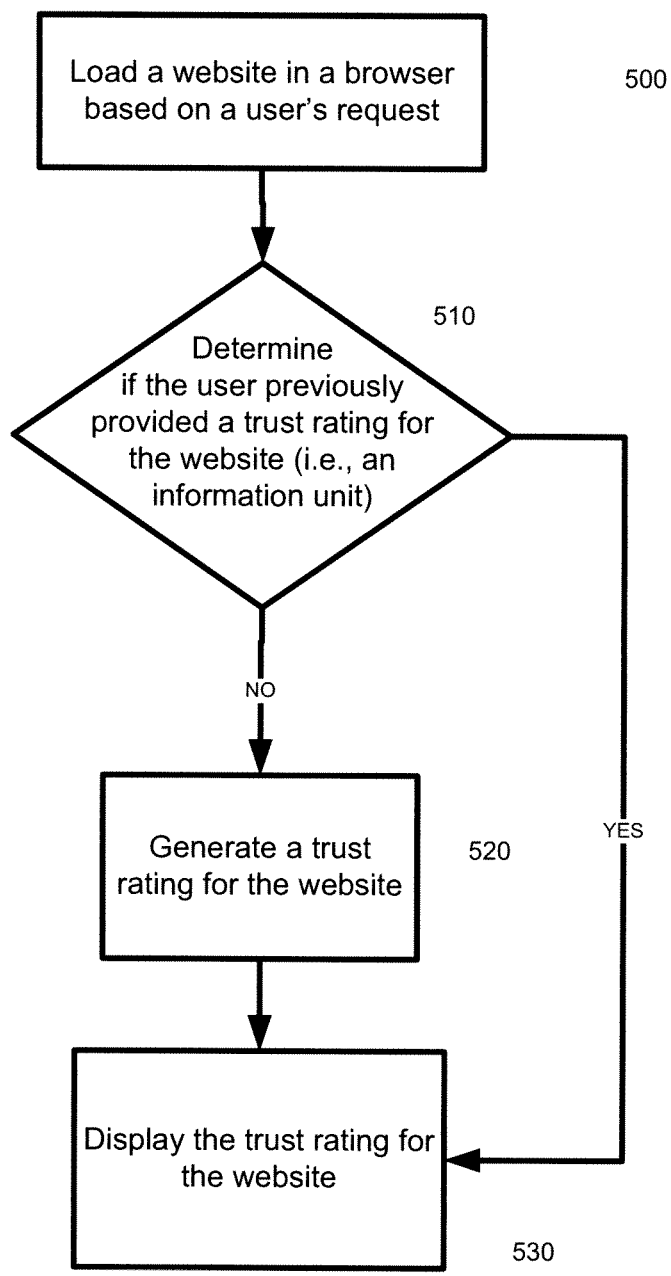
FIG. 5 is a flowchart illustrating a process for generating trust rating for network content according to one embodiment.

FIG. 5 is a flowchart of one embodiment of an information reliability system that includes a process for providing a user with a trust rating for an information unit. For example, when a user visits a website, the system can use a suitable predictive algorithm to determine an individualized trust rating for this user for any information unit on the website. For example, the computer could use collaborative filtering, an artificial neural network, or other suitable means to predict how any given user will rate any given website by identifying similarities between different users, and similarities between different information units, including the requested website. The patterns and values in this predictive algorithm associated with any given user or any given information unit will change as the system acquires new information.

In one embodiment, when information reliability server 110 receives a trust rating from the user, the system may update the predictive algorithm values associated with the user based on this provided trust rating. It may also update the values associated with the information unit. For example, if the user provided a high trust rating for Website X, based on this information, information reliability server 110 may update the values it provides to the user for statistically similar information units, or update the values it provides to statistically similar users for Website X. For example, if users who trust Website X also tend to trust Website Y, then when User A trusts Website X, the algorithm will increase the probability that he trusts Website Y as well (and hence increase the trust rating). Similarly, if User A tends to rate information units similarly to User B, then if User A trusts Website X, then the algorithm will increase the probability that User B will also trust Website X.

In one embodiment, information reliability server 110 can use, as part of the predictive algorithm, information about logical relationships between different information units. For example, two websites that have a high number of logical conflicts between them are likely to be dissimilar in viewpoint. As a result, a user who trusts one website will be less likely to trust the other website. In another embodiment, information reliability server 110 will use the factors described in the previous paragraph, as well as the tendency of two information units to agree or disagree (e.g., the logical relationship) to determine whether any given user would likely trust the website; however any combination of factors can be user as part of the predictive algorithm. For example, if User A trusts Website X (i.e., an information unit), and Website X frequently contradicts Website Y (i.e., another information unit), then information reliability system 110 will lower User A's trust prediction for Website Y. On the other hand, if User A trusts Website X, and Website X frequently supports Website Y, then information reliability system 110 will raise User A's trust prediction for Website Y. As another example, if User A trusts another information unit (e.g., a particular sentence) on Website X, and that information unit contradicts Website Y (or an information unit on Website Y), then information reliability system 110 will lower User A's trust prediction for Website Y (or lower the trust prediction for the contradictory information unit in Website Y). On the other hand, if User A trusts another information unit (e.g., a particular sentence) on Website X, and that information unit supports Website Y (or an information unit on Website Y), then information reliability system 110 will raise User A's trust prediction for Website Y (or raise the trust prediction for the supporting information unit on Website Y).

In one embodiment, information reliability server 110 uses collaborative filtering as part of the predictive algorithm. Collaborative filtering (CF) is a method of making automatic predictions (filtering) about the interests of a user by collecting "taste" information from many users (collaborating). In one embodiment, one assumption of CF is that those who agreed in the past will tend to agree again in the future. For example, given a sample of websites that a user trusts (or any other suitable information about the user), the CF engine or recommendation system makes predictions about which websites a user would likely trust. These predictions can be specific to the user, but use information gleaned from many users. In one embodiment, information reliability server 110 may use a CF engine that takes two steps to generate a trust rating: (1) look for other users who share the same trust rating patterns with the user; and (2) use the trust ratings from those other like-minded users to calculate a trust rating for the user. However, the CF engine can be implemented using any other suitable CF process.

In an alternative embodiment, information reliability server 110 can use demographic data about the user as part of the predictive algorithm to generate a trust rating. For example, using demographic statistics, if the user is in one demographic (e.g., a female between 25 and 30 years of age who lives in Atlanta), information reliability server 110 can generate a trust rating for the website based on the trust rating that others in the same demographic (i.e., other females between 25 and 30 years of age who live in Atlanta) provided for the website.

In another alternative embodiment, information reliability server 110 can use information about the user's social network as part of the predictive algorithm to generate a trust rating. For example, the system enables the user to associate or be virtually connected with other users of the system for the purposes of generating a trust rating for an information unit. Based on the user's associations or virtual connections, the predictive algorithm can generate a trust rating for a website based on the trust ratings provided by other users in the social network. That is, if information reliability server 110 determines that a user is associated or virtually connected with other users of the system, information reliability server 110 can generate a trust rating of the requested website for the user based on how other users in the social network rated the requested website. In one embodiment, the user can identify organizations or entities to associate or connect to, other than individual users (e.g., a company such as a news organization can create a user profile for association or virtual connection purposes). In one embodiment, the user can provide the system with access to one or more of the user's social networking accounts to gather data on friends of the user to create associations or virtual connections. The predictive algorithm uses this data to determine if the user's friends have user accounts stored in information reliability server 110 that can be associated with the user's profile.

In an alternative embodiment, information reliability server 110 can use a neural network as part of the predictive algorithm to generate a trust rating. For example, neural networks search for patterns in data and are capable of non-linear statistical data modeling. Thus, in one embodiment, these data patterns can be used to determine if a user would trust a particular information unit.

In addition to the above methods, other methods could be used either alone or in conjunction with the above, including but not limited to user-provided survey data about the user's beliefs (for example, users that self-identify "liberal" or "religious" may be more likely to believe certain websites); similarities in content between websites (for instance, if two sites have similar content, they are more likely to be similar in viewpoint); information about links between sites (for instance, if a site links to another site, it is more likely to be similar in content and viewpoint); user polls (for instance, if two users describe two sites as "liberal", they are more likely to have similar viewpoints); third party information about website content (for instance, if a poll shows that two sites have a reputation for being liberal, they are more likely to have similar viewpoints); information about the trustworthiness of other users (for instance, a religious user may not tend to trust information provided by nonreligious users); information about how long the information has been posted on the internet (for example, information that has been posted longer may be more reliable than recently posted information); or any other suitable method. It should be appreciated that these are only a few of the methods that could be used as part of the predictive algorithm. In practice, the actual combination of methods will of be determined empirically based on the data.

In one embodiment, if no information is known about the user to generate a trust rating, information reliability server 110 can generate a trust rating based on the average user's trust rating for the website, based on the majority rating of the website, or any other suitable statistic on previously gathered trust ratings for the website. In one embodiment, such a rating is the same as or similar to a trust rating offered to a guest or anonymous user of the system (i.e., a user without a profile on the system).

Thus, in one embodiment, when information reliability server 110 receives a new or updated trust rating for an information unit from a user, information reliability server 110 can update the values of the predictive algorithm. In an alternative embodiment, information reliability server 110 updates the values of the predictive algorithm based on any newly received or updated trust ratings on a periodic basis (e.g., once an hour, once a day, or any other suitable time interval). The update may also be manual or initiated by the system administrator or may occur at any suitable time.

In one embodiment, the flowchart of FIG. 5 begins when a user causes a browser to load a website at step 500. At step 510, the system determines if the user previously provided a trust rating for the loaded website. If the user provided a trust rating for the loaded website, the system displays the user's provided rating for the website at step 530. However, if the user has not previously provided a trust rating for the website, the system generates a rating for the website as described above and illustrated at step 520. The system then displays the user's provided rating for the website at step 530. It should be appreciated that the system will be capable of generating ratings for information units smaller than an entire website as discussed above.

In one embodiment, the system provides a user with a trust rating for an information unit in a network-based browser application. In one embodiment, the process begins when a user visits a website in a browser on a computer such as client device 122. The toolbar application automatically searches in a local cache or in a database on client device 122 to determine if a trust rating for the website already exits for the user. If the toolbar application determines that a trust rating for the newly loaded webpage is stored in cache or a database, the toolbar application displays the stored trust rating for the website as discussed above. In one embodiment, the toolbar application sends the URL and user identifier to the information reliability server 110 even if a cached trust rating for the website was found (e.g., to determine if the trust rating needs to be updated based on newly acquired information).

If the toolbar application determines that no trust rating for the newly loaded webpage is stored in cache, the toolbar application sends the URL and user identifier (or any other suitable information) to information reliability server 110. Information reliability server 110 determines whether the user has rated the URL before based on the information received from the toolbar application.

If information reliability server 110 determines that the user has not rated the URL before, information reliability server 110 uses the predictive algorithm to generate an individualized trust rating for the user (and the request information unit), as described above.

If information reliability server 110 determines that the user has personally provided a trust rating for the website, information reliability server 110 returns the user's own trust rating to the toolbar application. That is, in one embodiment, the user's own trust rating overrides any trust rating generated by the predictive algorithm. It should be appreciated that in one embodiment, the system can provide the user with a generated trust rating in addition to the user's own trust rating so the user has the opportunity to reevaluate the rating for the website. In an alternative embodiment, information reliability server 110 can transmit an indication that the user personally rated the website instead of transmitting the user's own trust rating (e.g., to save on data transactions between information reliability server 110 and client device 122). If information reliability server 110 transmitted a generated trust rating for the requested website, the toolbar application displays the generated trust rating. It should be appreciated that in certain browsers that employ a tabbed interface, the toolbar application can detect a switch between open tabs and display the proper trust rating associated with the website of the active tab within the web browser. The toolbar application may store the received rating in cache or a database (or update the cache/database to the new rating, if applicable).

It should be appreciated that the system will be capable of generating and sending ratings for information units smaller than an entire website (for example, a single sentence, among other information units, as previously discussed).

Figure 6:
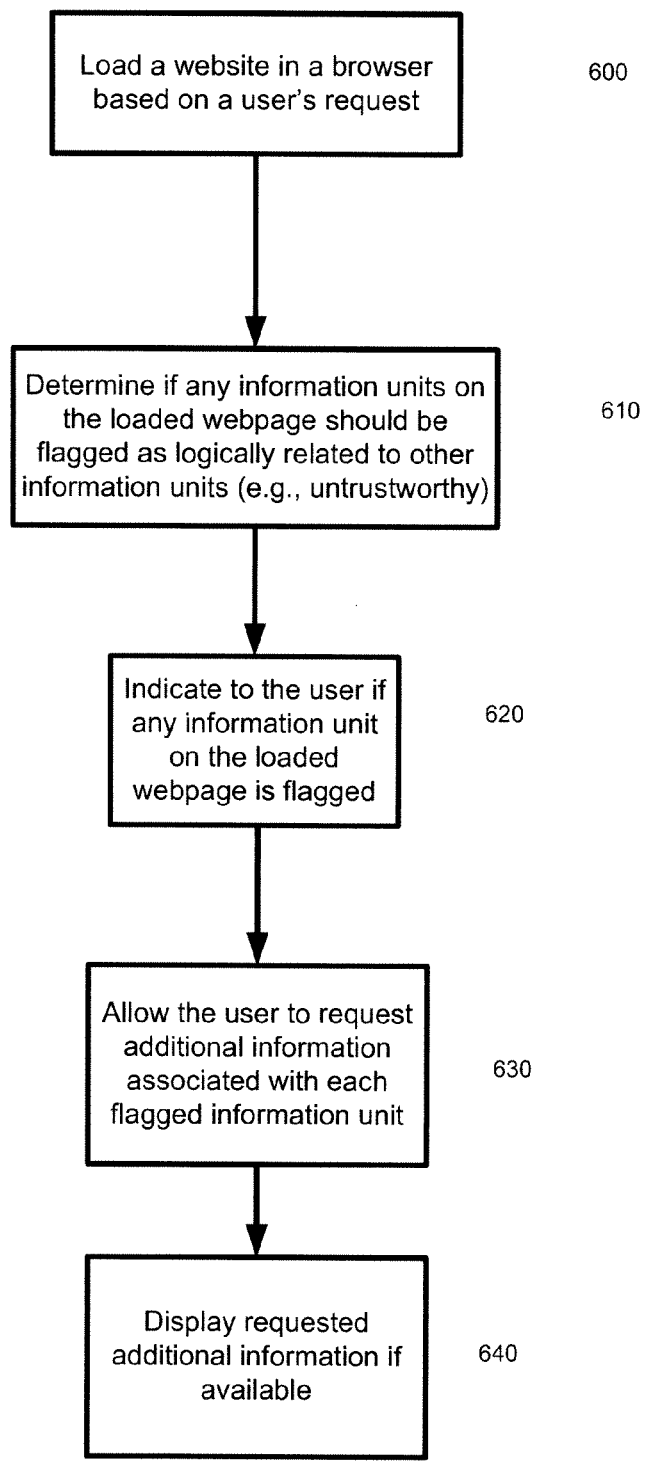
FIG. 6 is a flowchart illustrating a process for indicating logical relationships between network content according to one embodiment.

FIG. 6 is a flowchart of one embodiment of an information reliability system that includes a process for providing individualized trust ratings for information units, as well as identifying information units with logical relationships to other information units. For example, when a user visits a website, the system can visually flag (i.e., identify) information units on the webpage that have a particular trust rating, and/or are logically related with other information units anywhere on the network. It should be appreciated that flagging an information unit for a user may include highlighting the information unit, creating mouse-over events associated with the information unit, embedding a picture or symbol adjacent to the information unit, or identifying the information unit in any other suitable manner. It should also be noted that the system may flag logical relationships between information units in addition to, or in lieu of generating an individualized trust rating for the information unit as described above.

In one embodiment, the flowchart of FIG. 6 begins when a user causes a browser to load a website at step 600. At step 610, the system determines if any information unit on the loaded webpage should be flagged and/or if the system can generate a trust rating for the information unit. At step 620, the system indicates to the user if any of the information units on the loaded webpage are flagged. The system allows the user to request additional information associated with each flagged information unit at step 630. If the user requests any additional information about a flagged information unit, the system displays the requested additional information at step 640.

In one embodiment, the toolbar application sends the URL of the website and user identification (or any other suitable information) to information reliability server 110. The information reliability server 110 determines if any information unit on the webpage associated with the URL has been identified as untrustworthy, or as logically inconsistent with information units found on other websites. In an alternative embodiment, information units can be tagged as logically related to other content (e.g., content found in books, magazines, or any other suitable source). Information units can be tagged as logically related in one or more processes, as will be described below.

Information reliability server 110 uses the prediction algorithm to generate an individualized rating for at least one of the tagged information units, as described above. The individualized rating can be used to indicate whether the user should trust or question the tagged information unit. In one embodiment, the individualized rating for tagged content is determined based on the user's level of trust in the website of the tagged information unit and website of the logically related information unit. If a user is reading content on CNN.com and a sentence on the CNN.com webpage is tagged as logically inconsistent with a sentence on a WSJ.com (The Wall Street Journal) webpage, information reliability server 110 generates a rating for the flagged sentence based at least partially on the user's trust rating for the two websites. That is, if the user's trust rating for CNN.com is low and the user's trust rating for WSJ.com is high, the individualized rating for the tagged sentence may reflect that the user should question the veracity of the sentence. Alternatively, if the user's trust rating for CNN.com is high and the user's trust rating for WSJ.com is low, the individualized rating for the tagged sentence may reflect that the user should trust (i.e., not question) the veracity of the sentence. However, it should be appreciated that the individualized rating for each tagged information unit can be generated in any suitable manner and can be represented in any suitable manner as described herein.

Once the individualized ratings are generated, information reliability server 110 transmits the generated rating for each information unit to the toolbar application. In one embodiment, a threshold is used to determine whether the toolbar application will visually identify (flag) any of the tagged information units. For example, if the individualized rating for a tagged information unit is below a threshold (e.g., two stars), the toolbar application visually identifies the tagged information unit to the user. However, if the individualized rating for the tagged information unit is above the threshold, the toolbar application does not identify the tagged information unit to the user. In one embodiment, the threshold is set by the system or system administrator. Alternatively, the threshold can be set by the user, or in any other suitable manner. It should also be appreciated that in one embodiment, filters can be used to determine which tagged information units are visually displayed to the user. For example, a filter can be used to visually flag only the tagged information units that have been identified as logically inconsistent or logically consistent with other, more trusted information units. However, the filter can be implemented to filter out any suitable type of tagged information units.

The toolbar application may visually flag any tagged information units appearing on the requested webpage in many different ways. The toolbar application may highlight such tagged information units, change the color of the tagged information units, or insert a warning symbol adjacent to the tagged information units. However, any suitable method of indication can be used to identify the tagged information units. In one embodiment, an indication of the flagged information units may initially be hidden (i.e., not displayed). For example, the indication of the flagged information units is not displayed unless the user specifically seeks clarification about the veracity of an information unit, such as by placing the cursor over the information unit (e.g., through a mouseover action) or using any other suitable request mechanism.

In one embodiment, the toolbar application may provide additional information associated with the flagged information unit. In one embodiment, the toolbar application waits for the user to request additional information (e.g., through a mouseover action), before providing additional information about the flagged information unit. That is, the toolbar application allows the user to read the website and waits for the user to request additional information about any information unit that has been flagged. In one embodiment, if the user places a cursor over a flagged information unit (e.g., initiates a mouseover event), the toolbar application may highlight the information unit (or visually flag the information unit in any other suitable manner). For example, if the user wanted to know more information about a particular sentence in a website in that has been flagged as untrustworthy, the user places the cursor over the flagged sentence, and the toolbar application highlights the sentence (or alternatively indicates the flagged sentence has been selected in another suitable manner). The toolbar application sends the selected information unit or some suitable identifier associated with the selected information unit to information reliability server 110.

In response to the user's request for more information, information reliability server 110 may send information regarding other information units that are logically related to the selected information unit to the toolbar application for display to the user. In one embodiment where the tag for the selected information unit is associated with a logical inconsistency, information reliability server 110 sends to the user the highest-rated information unit that contradicts the selected information unit. In one embodiment, information reliability server 110 may send one or more logically related information units from a plurality of sources. In an alternative embodiment, information reliability server 110 may send a summary of at least one logically related information unit. For example, the summary may include the user's most trusted site that disagrees with the information unit.

The toolbar application may also allow the user to select other information about why the information unit was flagged. For example, the toolbar application waits for the user to place the mouse over the flagged information unit and right click. However, the toolbar application can be configured to receive the request from the user through any other suitable input. In one embodiment, when the user requests additional information, the toolbar application provides a drop-down menu that displays statistics associated with the flagged information unit and a link to a "bibliography" page that displays other information units that have been tagged as logically related to the selected information unit. For example, the statistics may illustrate how many sources have information units that contradict the selected information unit, or the most trusted concurring source and the most trusted dissenting source (however, any suitable statistics can be provided). The bibliography page may include a link or information about each source that has content that contradicts or supports the selected information unit. However, it should be appreciated, that the bibliography page can include any suitable amount of information about logically related information units. It should also be appreciated that the statistics and bibliography can be selected and displayed in any suitable manner.

In one embodiment, when a user requests a webpage, information reliability server 110 can provide all of the information about any flagged information units associated with a webpage at once to the toolbar application. Thus, when the user places the mouse over a flagged information unit (or requests additional information in an alternative manner), the toolbar application can provide the information immediately without communicating with the information reliability server 110 for each request (e.g., the process is faster than if the toolbar application had to send a request to information reliability server 110 for each user inquiry). It should also be appreciated that information associated with the flagged information units can be provided to the toolbar application at any suitable time.

Figure 7:
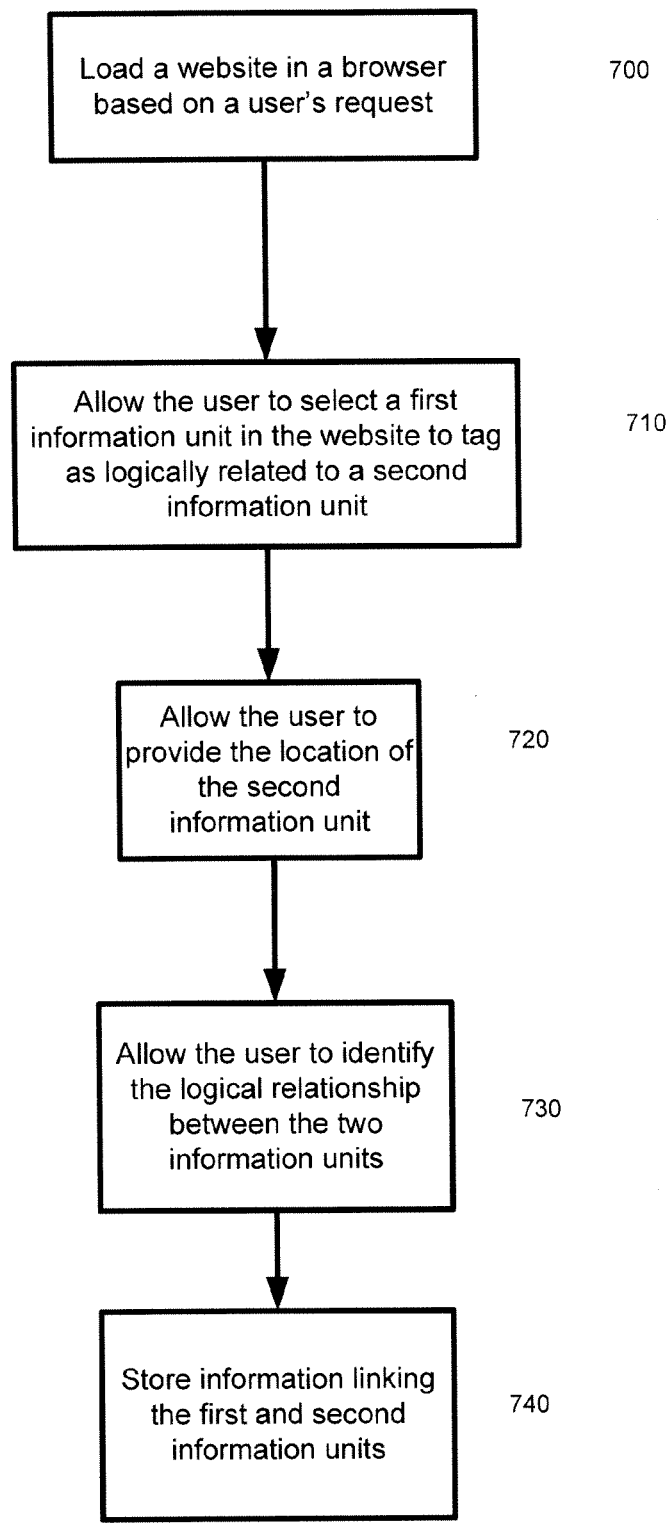
FIG. 7 is a flowchart illustrating a process for allowing a user to flag network content as logically related to other network content according to one embodiment.

FIG. 7 is a flowchart of one embodiment of an information reliability system that allows a user to identify ("tag") logical relationships between different information units. For example, the system allows the user to tag one information unit as logically inconsistent with another information unit elsewhere on the network. It should also be appreciated that tagging or indicating the logical relationship between information units may include tagging the information units as logically consistent, logically identical, or any other suitable logical relationship.

In one embodiment, the flowchart of FIG. 7 begins when a user causes a browser to load a website at step 700. At step 710, the system allows the user to select a first information unit displayed in the loaded website that the user wishes to tag as logically related to a second information unit elsewhere on the network. At step 720, the system allows the user provide the location of the second information unit. At step 730, the system allows the user to complete the tag by identifying the logical relationship between the two information units. As discussed above, the logical relationship can be identified as logically inconsistent, consistent, identical, or any other suitable logical relationship. The system stores information linking the two information units at step 740. It should be appreciated that a tag can consist of any suitable information about the relationship between the two information units. Thereafter, if either information unit is viewed by any user of the system, the system may indicate to the user that more information exists on the trustworthiness of the information unit, and its logical relationship to other information available on the network.

In one embodiment of the system, the user tags and identifies the logical relationship between information units in a network-based browser application. In one such embodiment, a user visits a website in a browser on a computer such as client device 122. If the user wishes to tag an information unit in the website as logically related to another information unit elsewhere on the network, a toolbar application associated with the browser allows the user to start the process of tagging the information unit. For example, the user may click on a button on the toolbar application to start the tagging process. However, the tagging process can be started in any suitable manner.

In one embodiment, once the tagging process is started, the toolbar application sends the URL of the website to the server such as information reliability server 110. The server parses and identifies information units on the website that can be tagged by the user. In one embodiment, the information units can be separately identified as a webpage, an article, a paragraph, a sentence, a phrase, an image, a number, a link, or any other suitable discrete element displayed on the website, or even as the entire website itself. Once the server has identified the information units that can be tagged, the server returns the identified information units to the toolbar application. The toolbar application displays the taggable information units to the user. In one embodiment, the toolbar application displays the taggable information units in a new browser tab or in a new browser window. In one embodiment, if the user previously tagged any information units on the website, the server may send this information to the toolbar application to identify visually (or identify in any suitable manner).

In one embodiment, once the website has been prepared for tagging, the toolbar application allows the user to identify at least one information unit on the website to be tagged. For example, the toolbar application may allow the user to highlight the identified information unit and select a button on the toolbar application to confirm the user's selection. It should be appreciated that the user can identify and confirm the selection of an information unit to tag in any suitable manner.

The toolbar application then prompts the user to identify at least one other information unit that the user believes has a logical relationship to the initially identified information unit. For example, the toolbar application prompts the user to enter a URL that contains the second information unit. The toolbar application may allow the user to select the second information unit from a list of previously bookmarked information units (as described in more detail below). The toolbar application then loads the website associated with the URL and allows the user to highlight the second information unit. The user confirms the selection by selecting a button on the toolbar application. The toolbar application also prompts the user to identify the logical relationship between the identified information units (e.g., inconsistent, consistent, identical, etc. . . . ). The toolbar application sends the tagged information units, the logical relationship between the information units, the location of the information units, and any other suitable information to information reliability server 110 or other suitable device for storage in a database. The system may thereafter indicate to any or all users of the system that a logical inconsistency may exist for the tagged information units.

In one alternative embodiment, the server may not parse and identify taggable information units on the website. In one such embodiment, the toolbar application allows the user to tag any discrete element displayed on the website that can be identified or otherwise selected by the user.

Figure 8:
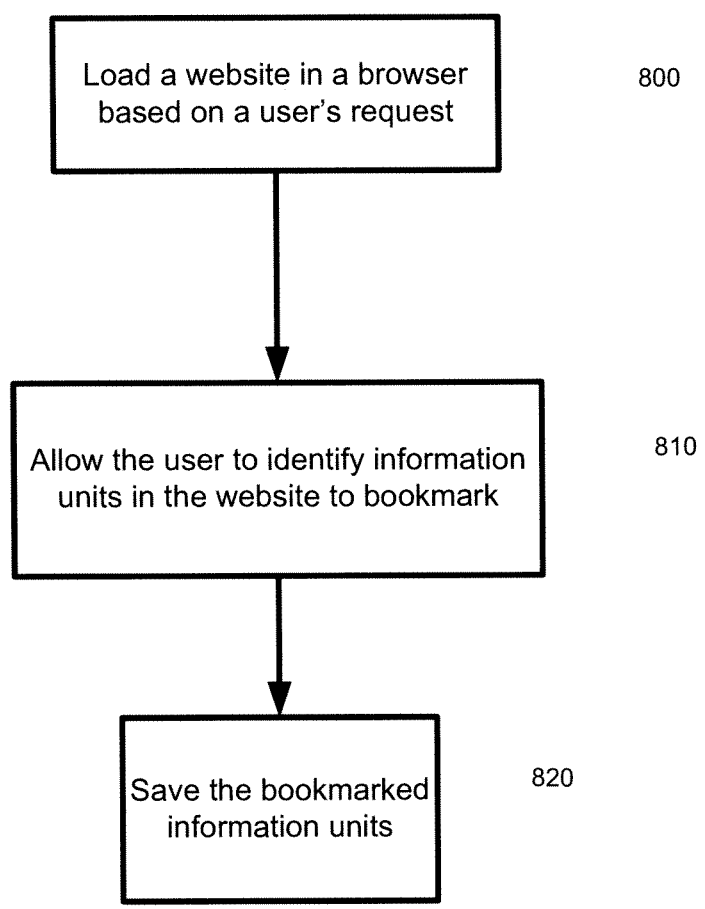
FIG. 8 is a flowchart illustrating a process for allowing a user to bookmark network content according to one embodiment.
Figure 9:
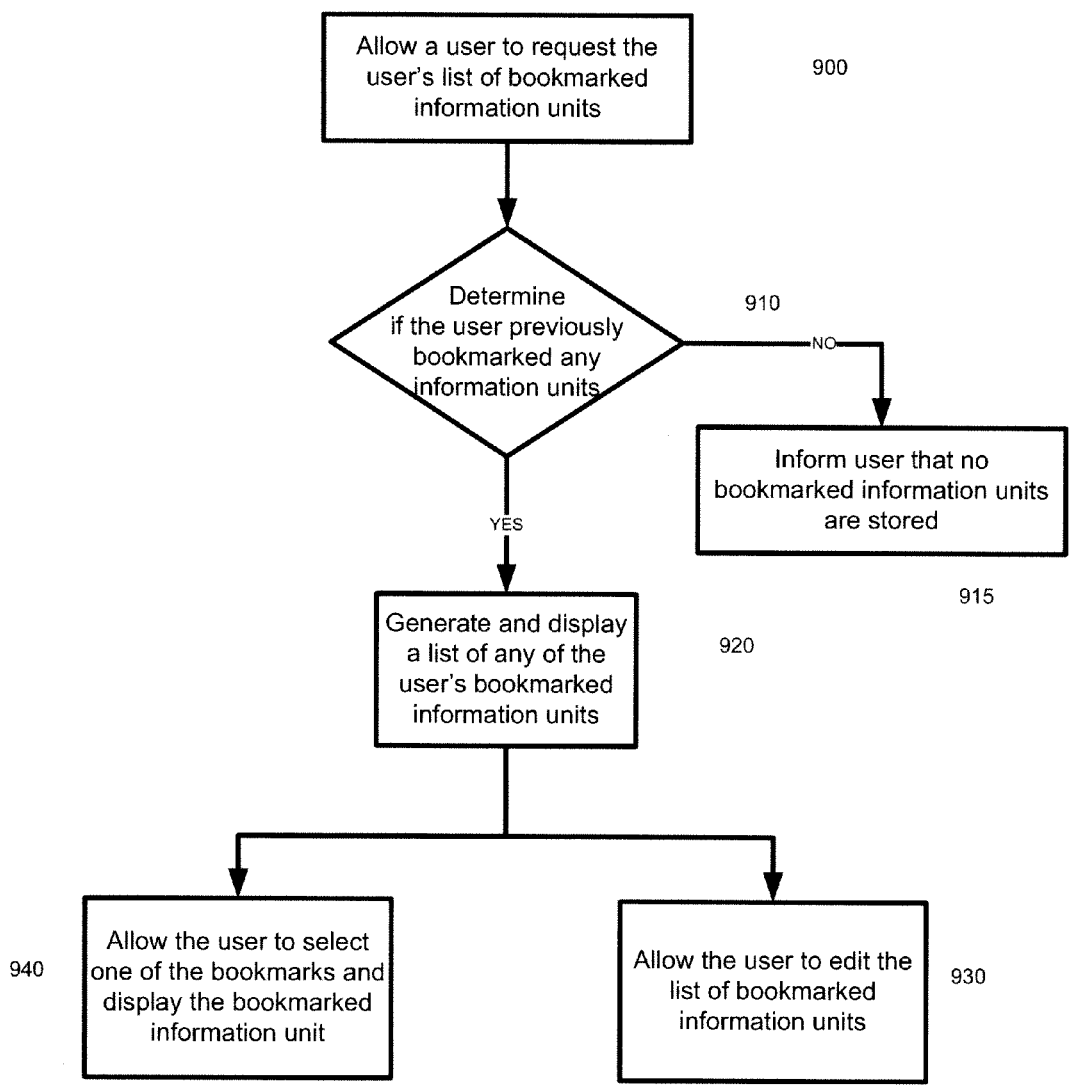
FIG. 9 is a flowchart illustrating a process for allowing a user to review and edit bookmarked network content according to one embodiment.

FIGS. 8 and 9 are flowcharts of various embodiments of an information reliability system that allows a user to bookmark information units that a user has reviewed and chosen to save for subsequent review (e.g., catalog and access previously viewed information units). In one example, the user may read a sentence on a webpage that the user wants to tag as logically related to some other information unit but is not yet ready to tag (e.g., the user may remember reading a statement on another website that is logically inconsistent with the sentence, but cannot remember the website that published the logically inconsistent statement). By bookmarking this sentence, the system allows the user to quickly find the bookmarked sentence at a later time so that the user can tag the sentence as logically related to another information unit (e.g., when the user finds or remembers the website of the logically inconsistent statement). Any suitable information unit can be bookmarked.

The flowchart of FIG. 8 illustrates one embodiment of a system that allows a user to identify and bookmark selected information units. At step 800, the user starts the process by causing a browser to load a website. At step 810, the system allows the user to identify and store (e.g., bookmark) at least one information unit in the loaded website that is of interest to the user. At step 820, the system stores any of the information units from the website that the user identified to the user's collection of bookmarked information units.

In one embodiment of the system that allows a user to bookmark information units, the user bookmarks information units in a network-based browser application. In this embodiment, a user loads a website in a browser on a computer such as client device 122. If the user wishes to bookmark an information unit (e.g., a statement, etc. . . . ) from the website, a toolbar application associated with the browser allows the user to identify and save the location of the information unit. For example, the user may highlight a sentence on the website with a cursor and click on a button on the toolbar application to bookmark (e.g., save) the highlighted statement. However, it should be appreciated that the bookmarking process can be performed in any suitable manner.

Once the user requests that the toolbar application bookmark the identified information unit, the toolbar application saves information associated with the bookmarked information unit. In one embodiment, the toolbar application saves the identified information unit on client device 122 in a database. Alternatively, the toolbar application sends information associated with the identified information unit to information reliability server 110 or any other suitable device for storage in a database. It should be appreciated that the toolbar application may save the identified information unit on both client device 122 and information reliability server 110. It should also be appreciated that any suitable information associated with the identified information unit may be stored to allow the bookmarked information unit to be retrieved at a later time (e.g., the URL of the website, a specific location within the website of the identified information unit, etc. . . . ).

The flowchart of FIG. 9 illustrates one embodiment of a system that allows a user to review and edit bookmarked information unit. At step 900, the system allows a user to request a list of information units that the user has previously bookmarked. At step 910, the system determines if user previously stored or bookmarked any information units. If the system determines that the user does not have any stored information units, the system may provide a message to the user to indicate that the user's collection is empty as shown at step 915; however, such a message is not required. At step 920, if the system determines that the user has previously bookmarked one or more information units, the system generates and displays a list of any information units that the user bookmarked. The system also allows the user to edit the list of bookmarked information units as shown in step 930 (e.g., add, delete, organize bookmarks). At step 940, the system allows the user to select one of any bookmarked information units and display the website with the bookmarked information unit (e.g., cause a browser to load the website that includes the selected bookmarked information unit and identify the selected bookmarked information unit within the website).

In one embodiment of the system that allows a user to bookmark information units, the user can review and edit previously bookmarked information units in a network-based browser application. In this embodiment, a user causes a toolbar application associated with the browser running on client device 122 to display at least one (or all) of the user's previously bookmarked information units. For example, the user may click on a button on the toolbar application to cause the toolbar application to display the user's bookmarked information units. The toolbar application determines if the user bookmarked any information units. In one embodiment, the toolbar application checks a bookmark database on client device 122 to determine if any bookmarks exist. In an alternative embodiment, the toolbar application communicates with information reliability server 110 or any other suitable device to determine if the user has bookmarked any information units. If any bookmarks are determined to exist, the toolbar application displays the bookmarks to the user (e.g., as drop down list originating from within the toolbar application, as a webpage displayable in the browser, or in any suitable manner). However, it should be appreciated that the bookmarks can be retrieved and displayed in any suitable manner.

In one embodiment, the user may select one of the bookmarks and the toolbar application causes the browser to download and display the webpage that includes the selected bookmarked information unit. The toolbar application may also cause the browser to go directly to the location of the bookmarked information unit within the webpage and highlight or otherwise identify the bookmarked information unit for the user.

In one embodiment, the toolbar application allows the user to edit the user's list of bookmarked information units. Editing may include deleting bookmarked information units, adding new bookmarks for information units, organizing bookmarked information units, or performing any other suitable edits. In one embodiment, the toolbar application allows the user to organize bookmarked information units such as by separating or sorting bookmarked information units by topic. However, it should be appreciated that the user can organize the bookmarked information units in any suitable manner.

In one embodiment, the system allows users to share bookmarked information units with other system users. For example, if a user is researching or attempting to find information unit related to a certain topic, the system allows a user to search for bookmarked information units shared by other users. Thus, it should be appreciated that bookmarked information units can be used to help a user quickly tag an information unit as logically related to other information units.

It should be appreciated that an information reliability system provides a customized rating for any identified information unit, which allows a user to quickly and easily determine what network accessible information is trustworthy and what network accessible information maybe untrustworthy based at least in part on the logical relationships between different information units and from information collected from the system users.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for determining information trustworthiness, the system comprising:
   at least one terminal; and at least one ratings server, wherein, the at least one terminal and the at least one rating server are in communication via at least one network to:
   (a) receive a trust rating request for a website URL from a user,
   (b) generate the trust rating for the a website URL or another website URL based on collaborative filtering with user profile data and trust ratings provided by the user, wherein the user's provided trust rating for one or more website URLs is used to modify the trust rating for the requested website URL and at least one stored logical relationship between the requested website URL and at least one other website URL, wherein the logical relationship comprises at least one of the following: logically consistent, logically inconsistent and logically identical, and wherein if the logical relationship is logically inconsistent and the user trusts the at least one other website URL, then the generated trust rating will be lower than if the user did not trust the at least one other website URL; and
   (c) display the generated trust rating to the user.

2. The system of claim 1, wherein the user's profile data includes at least one trust rating for an information unit that was provided by the user.

3. The system of claim 2, wherein a trust rating is generated based on an average rating for the information unit if no profile data is stored for the user.

4. The system of claim 1, wherein trust rating is further determined based in part on at least one stored trust rating associated with the information unit that was provided by another user.

5. The system of claim 1, wherein the logical relationships are provided by at least one user of the system.

6. The system of claim 1, wherein all of the information units contained in the website are associated with the same trust rating.

7. The system of claim 1, wherein different information units associated with the website have different trust ratings.

8. The system of claim 1, wherein a toolbar application operating on the terminal is the user's interface to request the trust rating and display the trust rating to the user.

9. The system of claim 1, wherein if the user previously provided a trust rating for the information unit, the user's own trust rating is displayed.

10. The system of claim 1, wherein the user's provided trust rating is used to at least partially determine a second trust rating for a different information unit for another user.

11. The system of claim 1, wherein the user's provided trust rating is used to at least partially determine at least one different trust rating for a different information unit requested by the user.

12. The system of claim 1, wherein the at least one terminal and the at least one rating server are in communication via the at least one network to receive a tag from the user indicating that the information unit is logically related to another information unit.

13. The system of claim 1, wherein the user's provided tag for the information unit is used to at least partially determine a second trust rating for the information unit for another user.

* * * * *